L. Hillebrand,

Trunk Lock.

No. 4,205. Reissued Dec. 20. 1870.

Witnesses:

T. C. Brecht

Harry King

Inventor:

Louis Hillebrand by

Wiedersheim & Norris

Attys.

N. PETERS, PHOTO-LITHOGRAPHER, WASHINGTON, D. C.

United States Patent Office.

LOUIS HILLEBRAND, OF PHILADELPHIA, PENNSYLVANIA.

Letters Patent No. 95,111, dated September 21, 1869; reissue No. 4,205, dated December 20, 1870.

IMPROVEMENT IN HASPS FOR TRUNK-LOCKS.

The Schedule referred to in these Letters Patent and making part of the same.

*To all whom it may concern:*

Be it known that I, LOUIS HILLEBRAND, of the city and county of Philadelphia and State of Pennsylvania, have invented a new and useful Improvement in Hasps; and I do hereby declare the following to be a clear and exact description of the nature thereof, sufficient to enable others skilled in the art to which my invention appertains to fully understand and use the same, reference being had to the accompanying drawing making part of this specification, in which—

Similar letters of reference indicate corresponding parts in the several figures.

Figure 1:
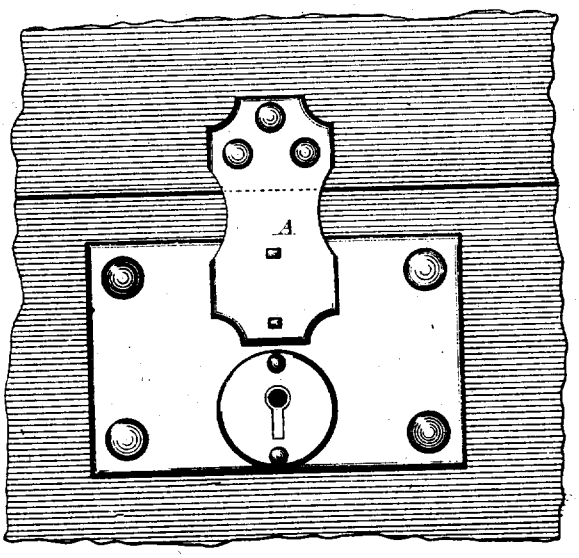
Figure 1 is a front view of the device illustrating my invention.

This invention consists in a hingeless spring-hasp, so constructed that its free or staple end shall stand off from the trunk when unlocked.

In the drawing—

A represents a hasp, which is to be secured to the lid of a trunk or elsewhere, in any well-known manner.

To the hasp is riveted or otherwise secured an eye or staple, B, which enters the opening in the lock and receives the bolt thereof.

Figure 2:
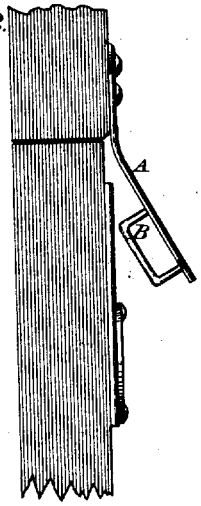
Figure 2 is a side view thereof.

The body of the hasp is made or cut out of a strip of spring or elastic metal, slightly bent, so that, when secured in place and free from the lock, it will stand out, as seen in fig. 2.

The operation of locking the hasp requires no special mention. The hasp is forced against or toward the lock; the staple B enters the opening, is caught by the bolt, and thus held until released.

To unlock the hasp the key is properly turned, and as soon as the bolt clears the staple the hasp flies out and frees itself from the lock without being handled.

Figure 3:
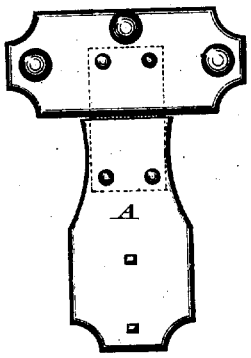
Figure 3 is a modification thereof.

The body of the hasp may consist of separate pieces of metal, united by an elastic strip, as in fig. 3, but the operation will be similar to that previously described.

It has been usual hitherto to construct hasps of two parts, connected together by a pintle, forming a hinged joint, in order that the lower part may be swung from the lock.

By my invention the elastic nature of the metal strip allows the hasp to yield and move after the manner of a hinge, but dispenses with the pintle and hinged joint, whereby a spring hasp is produced, combining strength, simplicity, and cheapness.

Having thus described my invention,

What I claim as new, and desire to secure by Letters Patent, is—

1. A hingeless spring hasp, whose free or staple end stands off from the trunk, when unlocked, in the manner described.

2. A hingeless trunk-hasp, having its body constructed wholly of, or in pieces united by, a strip of elastic metal, and operating in the manner and for the purpose described.

The above signed by me this 10th day of October, 1870.

LOUIS HILLEBRAND.

Witnesses:
JOHN A. WIEDERSHEIM,
D. WOLF.